(12) United States Patent
Li

(10) Patent No.: US 11,143,494 B2
(45) Date of Patent: Oct. 12, 2021

(54) DISTANCE MEASURING DEVICE

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Yueming Li, Hangzhou (CN)

(73) Assignees: HANGZHOU GREAT STAR INDUSTRIAL CO., LTD., Hangzhou (CN); HANGZHOU GREAT STAR TOOLS CO., LTD., Hangzhou (CN)

( * ) Notice: Subject to any disclaimer, the term of this patent is extended or adjusted under 35 U.S.C. 154(b) by 335 days.

(21) Appl. No.: 16/335,108

(22) PCT Filed: Jun. 21, 2017

(86) PCT No.: PCT/CN2017/089331
§ 371 (c)(1),
(2) Date: Mar. 20, 2019

(87) PCT Pub. No.: WO2018/232621
PCT Pub. Date: Dec. 27, 2018

(65) Prior Publication Data
US 2019/0234723 A1 Aug. 1, 2019

(51) Int. Cl.
*G01B 3/1084* (2020.01)
*G01S 17/08* (2006.01)
(Continued)

(52) U.S. Cl.
CPC ............ *G01B 3/1084* (2013.01); *G01B 3/10* (2013.01); *G01B 3/1041* (2013.01); *G01S 17/02* (2013.01); *G01S 17/08* (2013.01); *G01B 3/1094* (2020.01)

(58) Field of Classification Search
CPC ...... G01B 3/1084; G01B 3/10; G01B 3/1041; G01B 3/1094; G01S 17/02; G01S 17/08
(Continued)

(56) References Cited

U.S. PATENT DOCUMENTS 6,612,046 B1 9/2003 Cimorell et al.
7,024,791 B2 * 4/2006 Marshall .............. G01B 3/1041
33/768
(Continued)

FOREIGN PATENT DOCUMENTS

CN 2350725 Y 11/1999
CN 2760575 Y 2/2006
(Continued)

OTHER PUBLICATIONS

App. No. PCT/CN2017/089331; International Search Report and Written Opinion dated Mar. 23, 2018.
(Continued)

*Primary Examiner* — Yaritza Guadalupe-McCall
(74) *Attorney, Agent, or Firm* — Fitch, Even, Tabin & Flannery LLP

(57) ABSTRACT

The present invention provides a distance measuring device, comprising a casing, a third housing, a tapeline structure and a laser ranging device, in which the casing is comprised of a first housing and a second housing; the third housing is arranged between the first housing and the second housing, and rounding together with the second housing to form a tapeline cavity; the tapeline structure is arranged inside the tapeline cavity; and the laser ranging device is arranged between the first housing and the third housing.

16 Claims, 7 Drawing Sheets

(51) Int. Cl.
*G01B 3/1041* (2020.01)
*G01B 3/10* (2020.01)
*G01S 17/02* (2020.01)
*G01B 3/1094* (2020.01)

(58) Field of Classification Search
USPC .................................................. 33/755–771
See application file for complete search history.

(56) References Cited

U.S. PATENT DOCUMENTS

| | | | |
|---|---|---|---|
| 8,269,951 | B1 | 9/2012 | Courchesne |
| D680,888 | S | 4/2013 | Ranieri |
| D726,043 | S | 4/2015 | Cook et al. |
| 9,046,340 | B2 * | 6/2015 | Li .......................... G01B 3/10 |
| D787,347 | S | 5/2017 | Wortelboer et al. |
| D788,611 | S | 6/2017 | Anderson |
| 2004/0172839 | A1 * | 9/2004 | Zirk ..................... B43L 7/005 |
| | | | 33/451 |
| 2005/0024854 | A1 | 2/2005 | Wang |
| 2007/0107248 | A1 | 5/2007 | Jones |
| 2007/0227029 | A1 | 10/2007 | Shute et al. |
| 2014/0090264 | A1 * | 4/2014 | Li .......................... G01C 3/08 |
| | | | 33/760 |
| 2016/0069658 | A1 | 3/2016 | Klein |
| 2019/0234723 | A1 * | 8/2019 | Li ..................... G01B 3/1041 |

FOREIGN PATENT DOCUMENTS

| | | |
|---|---|---|
| CN | 101149437 A | 3/2008 |
| CN | 105222661 A | 1/2016 |
| CN | 105627857 A | 6/2016 |
| CN | 206002695 U | 3/2017 |
| CN | 206161845 U | 5/2017 |
| CN | 206862226 U | 1/2018 |
| CN | 207020310 U | 2/2018 |
| DE | 102009027668 A1 | 1/2011 |
| EP | 1903301 A2 | 3/2008 |
| JP | 5030985 Y | 9/1975 |
| JP | 3043916 U | 12/1997 |
| JP | 2000241544 A | 9/2000 |
| JP | 2003042701 A | 2/2003 |
| JP | 2004233106 A | 8/2004 |
| JP | 2007139537 A | 6/2007 |
| JP | 3195769 U | 1/2015 |
| TW | M447982 U1 | 3/2013 |
| WO | 2011006739 A1 | 1/2011 |
| WO | WO-2020160598 A1 * | 8/2020 |

OTHER PUBLICATIONS

Sun Changku et al.; "Laser Measurement Technique"; Tianjin University Press; 1st Edition; Jul. 2001; pp. 1-177.
SIPO; App. No. 201720724989.X; Examination Decision of Request for Invalidation (No. 42747); pp. 1-40.

* cited by examiner

DISTANCE MEASURING DEVICE

FIELD OF THE INVENTION

The present invention relates to the field of a distance measuring tool, and in particular, to a distance measuring device.

DESCRIPTION OF THE PRIOR ART

Tapelines and laser ranging devices are common distance measuring tools, which have found applications in fields of building construction, interior decoration, traffic accident disposition, and the like. In the prior art, when a tapeline is in use, the tap end part and the measuring terminal end of the tap need to be respectively leveled with the starting end and the terminal end of the object to be measured, and the measurer needs to use his/her hands or other auxiliary equipment to keep the tape to be fitted onto the object to be measured. In certain cases, an ordinary tapeline is inconvenient to operate and has lower measurement accuracy. For example, in the field of measurement at hazardous locations, the practicability of the ordinary tapeline is relatively poor.

For example, in the field of building constructions, the tapeline is often used to measure a lateral length of a high altitude object or a distance to a vertical reference object on the ground. Since there is no attaching point for the tapeline, the measurement can only rely on ocular estimation of the start point or the terminal point to be measured from a distance. Therefore, the error of the measured value may be large and the measurement accuracy may be poor, which will adversely affect the following construction work. If more accurate data of measurement at high altitude are desired to be acquired by using a tapeline, the measurer needs to build a supporting frame or climb high up using a ladder, so as to attach the tapeline to the object to be measured to complete the measurement. If the object to be measured is very long, more than two workers are needed to climb high up to complete the measurement, which is operationally cumbersome and has a high labor cost while it is dangerous due to the risk of falling of the measurer from high up.

In addition, due to the limit of the length of the tapeline, the application scenarios thereof are limited thereby, and the measurement range is relatively limited to places having smaller spaces rather than large spaces. The ordinary tapeline usually has a measurement range of 5 meters, 7.5 meters or 10 meters. Some specially made tapelines may even have a measurement range of up to 15 meters or 20 meters. However, the larger the measurement range of the tapeline is, the larger the volume thereof is, and thereby is inconvenient for the measurer to carry or use.

Although the laser ranging device of the prior art has higher measurement accuracy, it has larger volume and higher cost, and is inconvenient to carry and use. After being used over a long time, the light-emitting surface of the laser light source and the light-receiving surface of the light-sensitive device thereof will experience relatively large abrasion, thereby affecting light ray feedback sensitivity and distance measuring accuracy. Moreover, the laser ranging device has larger errors in short-distance measurements, is greatly limited in the fields such as interior decoration, and is difficult to achieve large-scale applications.

SUMMARY OF THE INVENTION

The object of the present invention is to provide a distance measuring device which solves the technical problems in the prior art tapeline such as large volume, inconvenient operation, low measurement accuracy, inconvenient carrying, and the like on particular occasions.

In order to solve the above technical problems, the present invention provides a distance measuring device, including a casing comprised of a first housing and a second housing; a third housing, arranged between the first housing and the second housing, and rounding together with the second housing to form a tapeline cavity; a tapeline structure, arranged inside the tapeline cavity; and a laser ranging device, arranged between the first housing and the third housing.

Further, in different embodiments, the first housing includes a first housing bottom face and a first housing side wall; the second housing includes a second housing bottom face and a second housing side wall; the third housing includes a third housing bottom face and a third housing side wall; the second housing side wall and the first housing side wall are connected to each other, forming a side wall of the housing; and the third housing side wall is connected to the second housing bottom face.

Further, in different embodiments, the distance measuring device further includes a sheath partially or fully covering the first housing side wall and the second housing side wall; and/or partially or fully covering a joint between the first housing bottom face and the first housing side wall.

Further, in different embodiments, the laser ranging device includes a laser generating means for emitting measurement light beams to an object to be measured; the object to be measured reflecting the measurement light beams, and generating reflective light rays; a photoelectric conversion means, for capturing all or part of the reflective light rays, and converting an optical signal of the captured reflective light rays into at least one feedback electric signal; a circuit board, provided with a processor; and a power supply, connected to the laser generating means, the photoelectric conversion means and the circuit board; in which, the processor is connected to the laser generating means, for controlling the laser generating means; the processor is connected to the photoelectric conversion means, for acquiring the feedback electric signal, and calculating the distance from the object to be measured to the distance measuring device.

Further, in different embodiments, the laser generating means includes a light-emitting surface recessed on the first housing side wall; and the photoelectric conversion means includes a light-receiving surface recessed on the first housing side wall and being adjacent to the light-emitting surface.

Further, in different embodiments, the circuit board is parallel with the first housing bottom face; the laser generating means, the photoelectric conversion means and the circuit board are all located above or beneath the power supply; and the laser generating means and the photoelectric conversion means are located at the left side or right side of the circuit board.

Further, in different embodiments, the circuit board is located at the left side or right side of the power supply; and the circuit board is parallel with the first housing bottom face.

Further, in different embodiments, the distance measuring device further includes an viewing panel, which is made of transparent material and arranged on the surface of the first housing and/or the second housing; a display means mounting bracket, which inwardly protrudes from the first housing bottom face and the first housing side wall, and is arranged opposite to the viewing panel; and a display means, which is parallel with the viewing panel and is mounted to the display means mounting bracket; the display means is connected to the processor, for displaying the distance from the object to be measured to the distance measuring device.

Further, in different embodiments, an included angle between the plane where the viewing panel is located and the plane of the casing bottom is 30 to 60 degrees, and an included angle between the plane where the display means is located and the plane of the casing bottom is 30 to 60 degrees.

Further, in different embodiments, the distance measuring device further includes an operating circuit board which is parallel with the circuit board, fixed to the first housing bottom face, and electrically connected to the processor; a press switch, provided at one side of the operating circuit board close to the first housing bottom face; and a key which passes through the first housing bottom face, one end of the key being connected to the press switch and the other end thereof being arranged at the first housing outer surface.

Further, in different embodiments, the first housing bottom face includes a key mounting hole penetrating through the first housing bottom face; and a mounting hole groove, provided at an edge of the key mounting hole; the key includes a key body which is columnar and penetrates through the key mounting hole, and a key snap block protruding from the key body edge and snapped into the mounting hole groove.

Further, in different embodiments, the circuit board is provided with a memory which is connected to the processor, for storing the distance from the object to be measured to the distance measuring device.

Further, in different embodiments, the laser generating means includes, but not limited to, a laser tube; the photoelectric conversion means includes, but not limited to, a photoelectric sensor; and the power supply includes, but not limited to, a button battery, a rectangular parallelepiped battery or a cylindrical battery.

Further, in different embodiments, the tapeline structure includes a tapeline wheel, rotatably mounted into the tapeline cavity; a tape, fully or partially wound onto the tapeline wheel; one end of the tape is fixedly connected to the tapeline wheel, and the other end thereof is provided with a tapeline end portion; and a tape outlet, provided at the lower end of the side wall of the casing, the tapeline end portion extending out of the casing through the tape outlet.

Further, in different embodiments, the middle of the second housing bottom face is provided with a protruding shaft lever, which is perpendicular to the second housing bottom face; the center of the tapeline wheel is provided with a sleeve hole circumferentially surrounding the outside of the shaft lever; and the tapeline wheel rotates when the tape is pulled out.

Further, in different embodiments, the tapeline structure further includes a press block, provided inside the tapeline cavity and close to the tape outlet; an elastic member, one end of which is connected to the press block, and the other end thereof is connected to the second housing; and a lock key, connected to the second housing or the third housing through the elastic member; one end of the lock key is provided at the outer surface of the second housing, and the other end is tangent to or separated from the press block; when the lock key is pressed, the lock key is tangent to the press block, and the press block releases the tape; when the lock key is released, the lock key is separated from the press block and the press block presses against the tape.

The present invention has the advantages that a distance measuring device is provided, in which the tapeline is combined with the laser ranging device, with the functions of short-distance measurement and long-distance measurement, having the characteristics of simple operation, convenient carrying, low cost, high measurement accuracy, and the like, and being suitable for popularization and application on a large scale in the fields of building construction, interior decoration and danger zone measurement.

Figure 1:
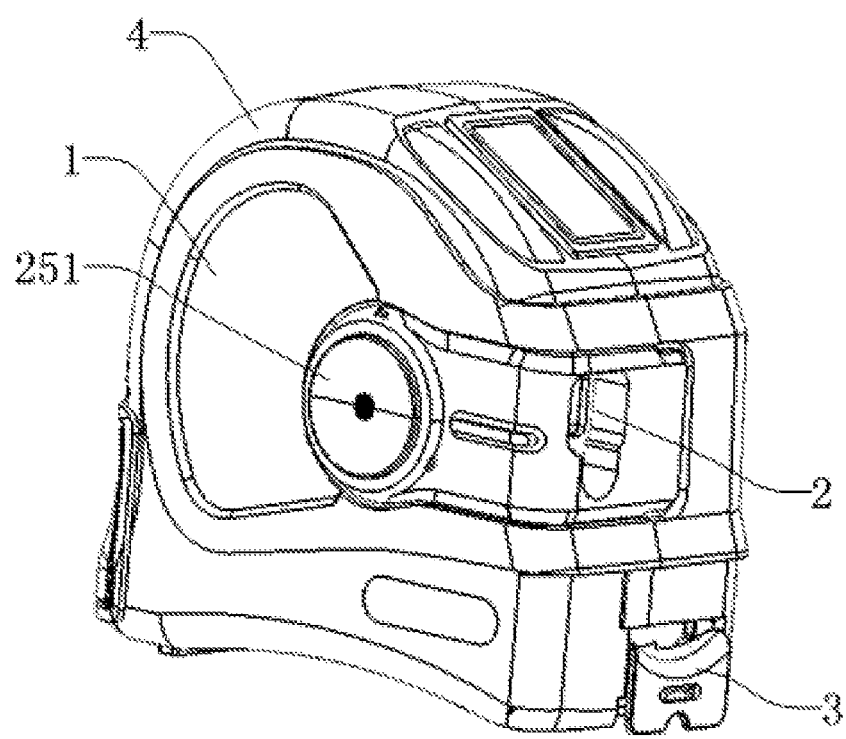
FIG. 1 is a front structural schematic view according to the embodiment of the present invention.

REFERENCE NUMERALS IN THE DRAWINGS 1 casing, 2 laser ranging device, 3 tapeline structure, 4 sheath, 5 clip;
11 first housing, 12 second housing, 13 third housing;
21 laser generating means, 22 photoelectric conversion means, 23 circuit board, 24 display means, 25 operating means:
26 power supply, 27 viewing panel, 28 display means mounting bracket:
31 tapeline wheel, 32 tape, 33 tape outlet, 34 press block, 35 lock key, 36 tapeline end portion;
37 elastic member, 38 shaft lever;
111 first housing bottom face, 112 first housing side wall, 121 second housing bottom face, 122 second housing side wall,
131 third housing bottom face, 132 third housing side wall;
211 light-emitting surface, 221 light-receiving surface, 231 processor, 232 memory;
251 key, 252 operating circuit board, 253 press switch; 311 sleeve hole;
1111 key mounting hole, 1112 mounting hole groove, 2511 key body, 2512 key snap block

DETAILED DESCRIPTION OF THE PREFERRED EMBODIMENTS

The present invention will be described more fully for those skilled in the art hereinafter with reference to the accompanying drawings by introducing one of the preferable embodiments of the present invention, for the purpose of clarity and better understanding of the techniques. This invention may be embodied in various different forms and the invention should not be construed as being limited to the embodiments set forth herein.

In the description, elements with identical structures are marked with the same reference numerals, and like elements with similar structure or function are marked to throughout with like reference numerals, respectively. The dimension and thickness of each of the elements in the accompanying drawings are arbitrarily shown, and the invention does not define the dimension and thickness of each element. Certain elements may be shown somewhat exaggerated in thickness in the interest of clarity.

Directional relative terms mentioned in the present invention, such as "upper", "lower", "front", "back", "left", "right", "inside", "outside", "side", and the like, are only directions by referring to the accompanying drawings, and are merely used to explain and describe the present invention, but the present invention is not limited thereto.

It will be understood that when an element is referred to as being "on/above" another element, it can be directly placed on the other element, or there may be an intermediate element on which it is placed, and the intermediate element is placed on the other element. When an element is referred to as being "mounted to" or "connected to" another element, either one can be understood as being directly "mounted" or "connected", or via an intermediate element to be indirectly "mounted to" or "connected to" the other element.

Figure 2:
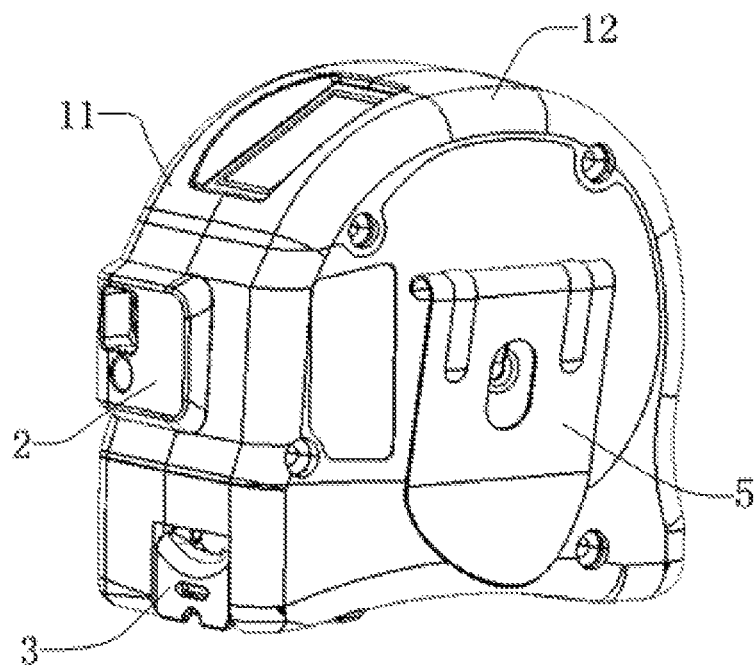
FIG. 2 is a rear structural schematic view according to the embodiment of the present invention.
Figure 3:
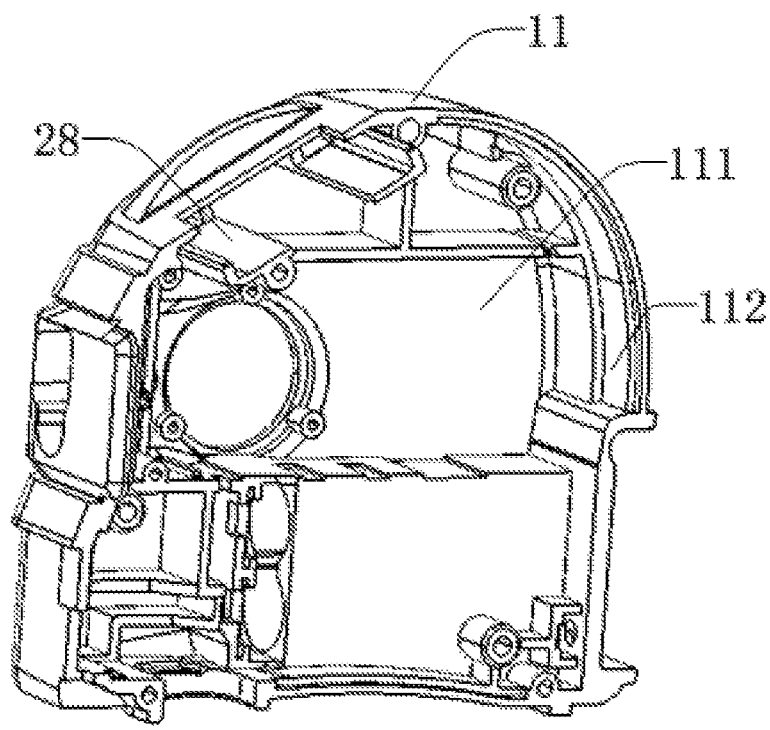
FIG. 3 is a structural schematic view of the first housing according to the embodiment of the present invention.

As shown in FIGS. 1-3, the present invention provides a distance measuring device, including a casing 1, a laser ranging device 2 and a tapeline structure 3.

As shown in FIGS. 1-2, the casing 1 is an irregular rectangular parallelepiped, whose width is equal to or approximately equal to its height, with a thickness of 25%~40% of its width.

Figure 4:
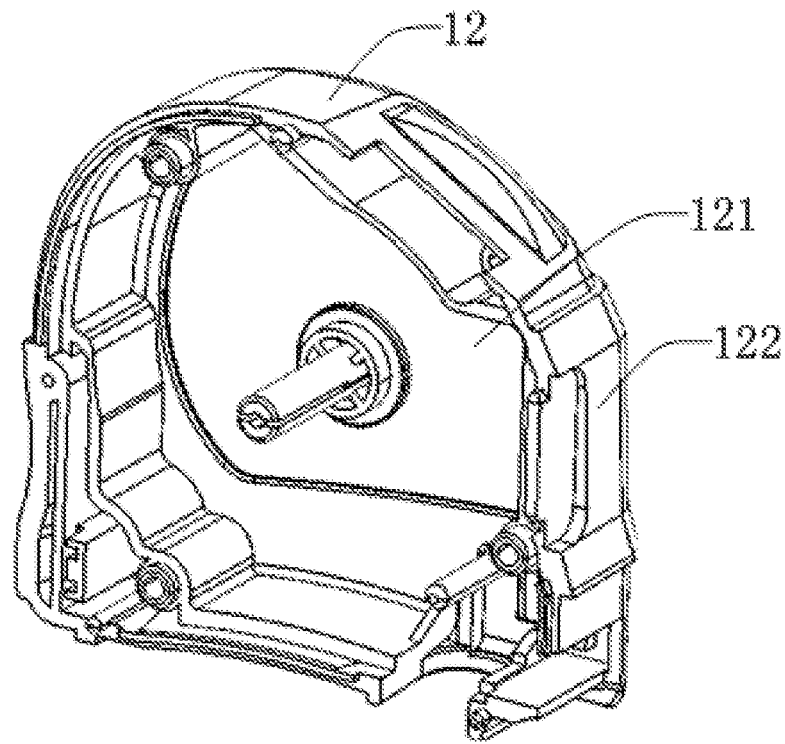
FIG. 4 is structural schematic view of the second housing according to the embodiment of the present invention.

As shown in FIGS. 2-4, the casing 1 consists of a first housing 11 and a second housing 12; the first housing 11 includes a first housing bottom face 111 and a first housing side wall 112; the second housing 12 includes a second housing bottom face 121 and a second housing side wall 122; the second housing side wall 122 is connected to the first housing side wall 112, together forming the side wall and bottom face of the casing 1.

Figure 5:
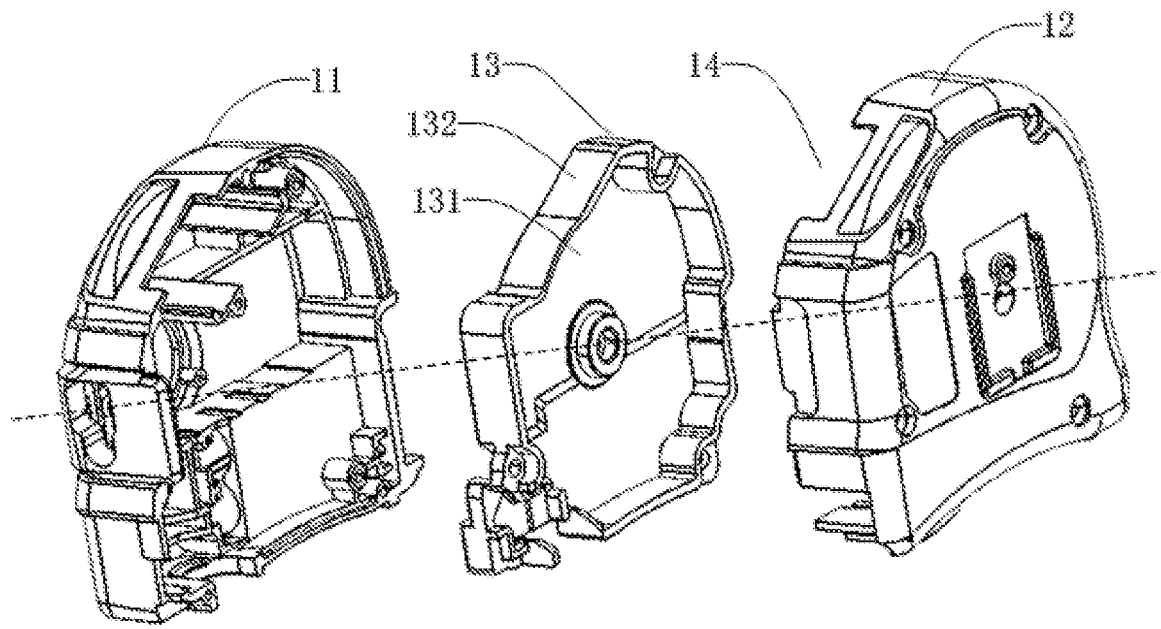
FIG. 5 is a structural schematic view of the exploded first housing, second housing and third housing according to the embodiment of the present invention.

As shown in FIG. 5, a third housing 13 is provided between the first housing 11 and the second housing 12, the third housing 13 includes a third housing bottom face 131 and a third housing side wall 132; the third housing side wall 132 is connected to the second housing 12 bottom face, the third housing 13 and the second housing 12 are together rounded to form a tapeline cavity 14. The tapeline structure 3 is arranged inside the tapeline cavity 14; and the laser ranging device 2 is arranged between the first housing 11 and the third housing 13.

The present embodiment further includes a sheath 4 which is made of elastic material or soft material, partially or fully covering the first housing side wall 112 and the second housing side wall 122, and/or partially or fully covering the joint between the first housing bottom face 111 and the first housing side wall 112. The sheath 4 serves to enhance the hand feeling, increase the friction coefficient between the distance measuring device and the user's hand, and prevent the distance measuring device from sliding off from the user's hand; meanwhile, if the distance measuring device slides off from the user's hand, the sheath has certain cushioning effect, and protects the internal electronic devices and mechanical structures from being broken.

Figure 6:
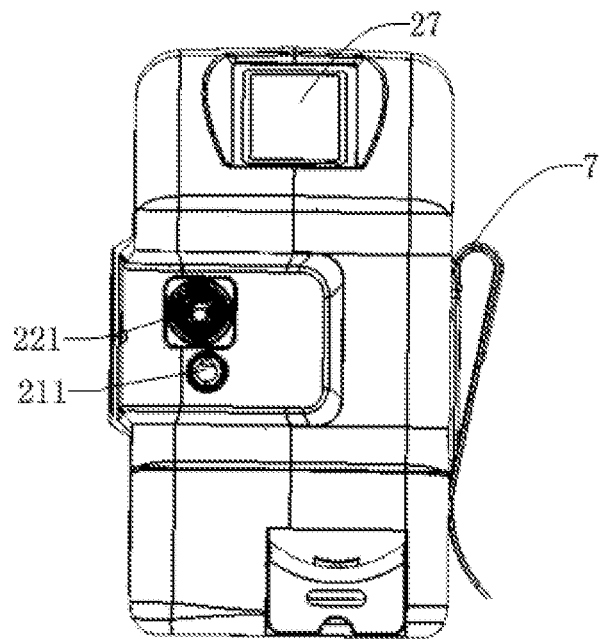
FIG. 6 is side structural schematic view according to the embodiment of the present invention.
Figure 7:
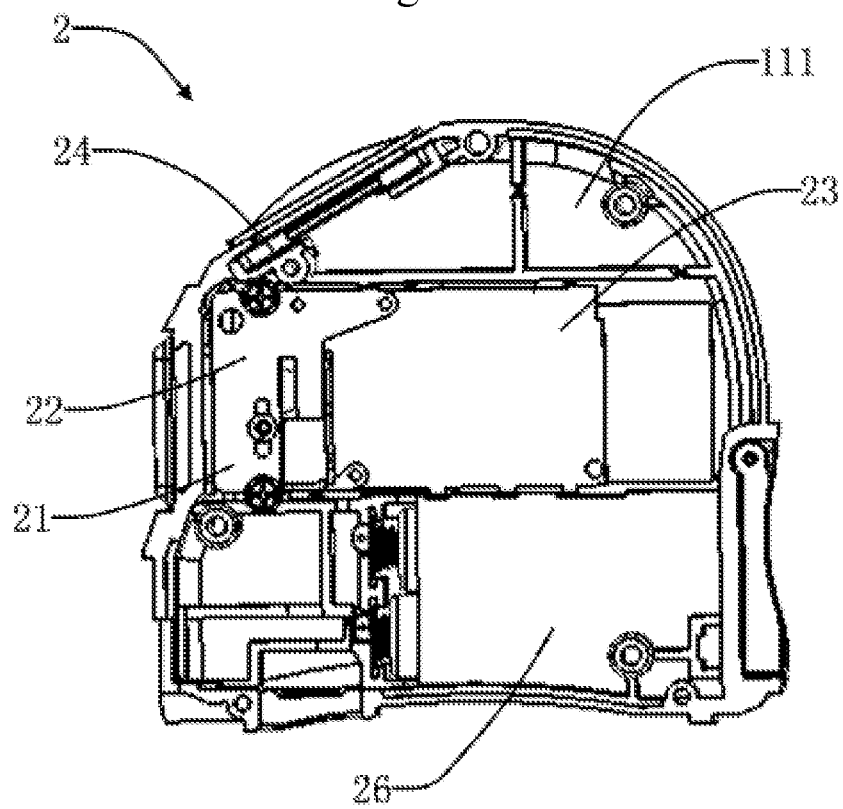
FIG. 7 is a structural schematic view of the inside of the first housing in the embodiment of the present invention.
Figure 8:
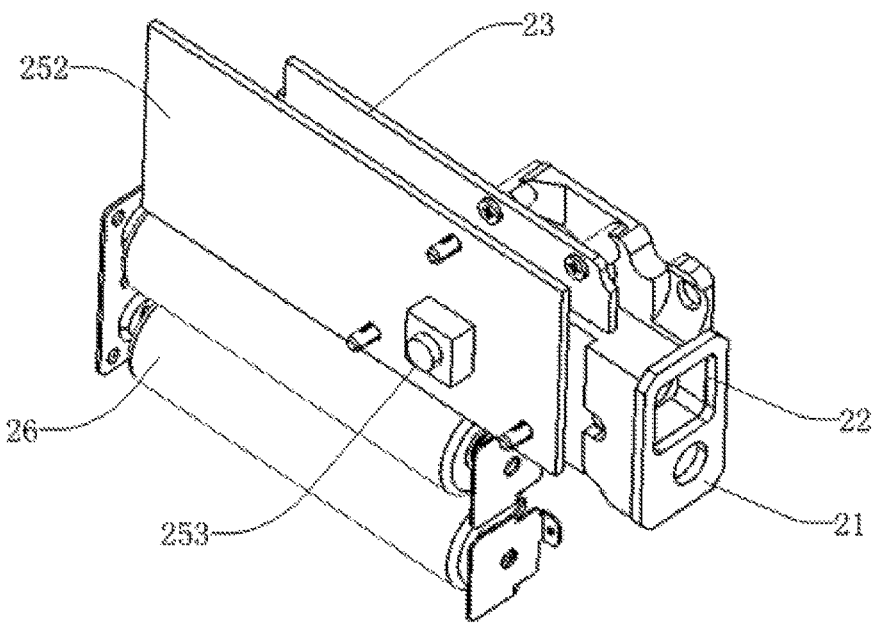
FIG. 8 is a structural schematic view of the part of the laser ranging device inside the first housing according to the embodiment of the present invention.

As shown in FIGS. 6-8, the laser ranging device 2 includes a laser generating means 21, a photoelectric conversion means 22, a circuit board 23, a display means 24, an operating means and a power supply 26.

The laser generating means 21 is preferably a laser tube, that is, a glass sealed-off $CO_2$ laser, but not limited to a laser tube, and other devices capable of generating laser beams can be used. The photoelectric conversion means 22 is preferably a photoelectric sensor, but is not limited thereto, and other devices capable of capturing light rays and converting the optical signal into the electric signal can be used. The laser generating means 21 and the photoelectric conversion means 22 can be arranged side by side, or up and down. In the present embodiment, preferably, the laser generating means 21 and the photoelectric conversion means 22 are arranged up and down and are integrally combined.

The laser generating means 21 includes a light-emitting surface 211, and the photoelectric conversion means 22 includes a light-receiving surface 221. The light-receiving surface 221 is arranged next to the light-emitting surface 211, adjacent to the light-emitting surface 211. If being arranged at the outer surface of the housing, the light-emitting surface and the light-receiving surface are easily abraded during carrying, using and maintaining. After a long-time use, due to much abrasion, the light ray feedback sensitivity and measurement accuracy of the distance meter would be reduced, and the service life is shortened. In the present embodiment, the light-emitting surface 211 and the light-receiving surface 221 are both recessed on the first housing side wall 112, with the recess depth greater than 5 mm or greater than 10 mm, such that the light-emitting surface 211 and the light-receiving surface 221 are not abraded. Under the precondition that the normal operation of the laser generating means 21 and the photoelectric conversion means 22 are not affected, the service life of the light-emitting surface 211 and the light-receiving surface 221 are further prolonged, and the light ray feedback sensitivity and measurement accuracy of the distance meter are guaranteed.

Figure 9:
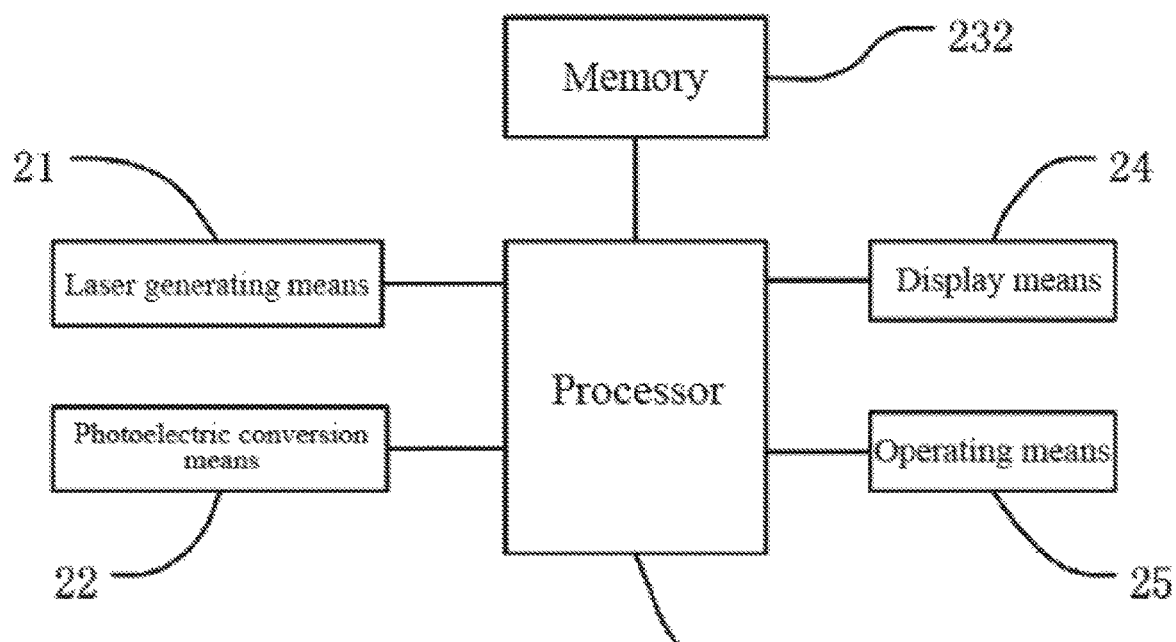
FIG. 9 is a structural schematic view of the circuit of the laser ranging device according to the embodiment of the present invention.

As shown in FIG. 9, the circuit board 23 is provided thereon with at least one processor 231. The processor 231 is connected to the laser generating means 21 for controlling the normal operation of the laser generating means 21. The processor 231 is connected to the photoelectric conversion means 22, for acquiring the feedback electric signal, and calculating the distance from the object to be measured to the distance measuring device according to the present embodiment. Optionally, the circuit board 23 is provided thereon with a memory 232 connected to the processor 231, for storing the distance from the object to be measured to the distance measuring device, in order for the user to look up reading records in the display means 24 again when forgetting the reading.

In the present embodiment, during operation, the processor 231 issues a control signal to command the laser generating means 21 to emit laser beams, as measurement light beams, to the object to be measured. The measurement light beams form a reflection on the surface of the object to be measured, to generate reflective light rays. A part of the light rays parallel with the measurement light beams out of the reflective light rays can be captured by the photoelectric conversion means 22, is converted into an electric signal, and is fed back to the processor 231. The processor 231 can be provided therein with a timer to record a time point when the laser generating means 21 emits laser beams and a time point when the feedback electric signal is obtained. According to the time difference between the two time points, the distance from the object to be measured to the distance measuring device can be calculated. During this period of time, the laser beam goes back and forth between the object to be measured and the distance measuring device at the light velocity. Half of the product of the time difference and the light velocity is the distance to be measured between the object to be measured and the distance measuring device.

In the present embodiment, both of the light-emitting surface of the laser generating means and the light-receiving surface of the photoelectric conversion means can be arranged at the outer surface of the housing (for example, the left side surface 13 of the housing), the laser generating means 21 emits laser beams from the light-emitting surface 211, as the measurement light rays; the photoelectric conversion means 22 captures the outside reflective light rays through the light-emitting surface 221. Since the laser beam is perpendicular to the plane where the light-emitting surface 211 is located all the time, the light-emitting surface 211 can be used for helping the user target the object to be measured, such that the laser beam can be directly illuminated to the object to be measured. In order to ensure the reflective effect, it is best to directly illuminate the laser beams to the plane where the object to be measured is to located, and to make the laser beam be perpendicularly illuminated to this plane to the greatest extent. In this way, much light rays can be reflected back to the distance measuring device in the same way, such that the measured result is more accurate.

In the present embodiment, a central point of the light-emitting surface 211 and the central point of the light-receiving surface 221 are located on the same straight line. The shorter the distance from the light-emitting surface 211 to the light-receiving surface 221 is, the smaller the error is. Theoretically, if the central point of the light-emitting surface 211 is fully overlapped with that of the light-receiving surface 221, the error is the smallest, which however is difficult to realize currently.

Generally, the area of the light-receiving surface 221 is 3-10 times of that of the light-emitting surface 211. The laser beams can keep traveling in a straight line all the time when emitted, but after the laser beams are reflected on the surface of the object to be measured, if the object to be measured is not a mirror surface with excellent reflective effects, it is difficult to ensure the strength and quantity of the light rays able to return back to the vicinity of the light-emitting surface 211 in the same way after reflection, even if the laser beams can be illuminated on the object to be measured perpendicularly to the surface of the object to be measured. Therefore, the appropriate enlargement of the area of the light-receiving surface 221 can further increase the measurement accuracy and the feedback sensitivity.

As shown in FIG. 8, the circuit board 23 is parallel with the first housing bottom face 111, and is located at the same height as the laser generating means 21 and the photoelectric conversion means 22. The laser generating means 21 and the photoelectric conversion means 22 are located at the left side or the right side of the circuit board 23; the laser generating means 21, the photoelectric conversion means 22 and the circuit board 23 are all located above or beneath the power supply 26. In the present embodiment, the laser generating means 21 and the photoelectric conversion means 22 have small volumes, and leave enough space to place the circuit board 23 at the same height, thereby effectively reducing the overall thickness of the distance measuring device. Meanwhile, the top of the casing can be designed into arc-shaped, instead of square, which can effectively reduce the volume and the occupation space of the product, such that the product is more portable.

In other embodiments, the circuit board 23 and the power supply 26 can be located at the same height side by side, at the left side or right side of the power supply 26.

As shown in FIGS. 3, 6 and 7, the present embodiment further includes a display means 24, a viewing panel 27 and a display means mounting bracket 28.

The viewing panel 27 is made of transparent material and arranged at the surface of the first housing 11 and/or the second housing 12, for protecting the display means 24. The display means mounting bracket 28 inwardly protrudes from the first housing bottom face 111 and the first housing side wall 112 and is arranged opposite to the viewing panel 27. The display means 24 is parallel with the viewing panel 27 and is mounted to the display means mounting bracket 28. In the present embodiment, the display means 24 is preferably a display screen, connected to the processor 231, for displaying the distance from the object to be measured to the distance measuring device.

The included angle between the plane where the viewing panel 27 is located and the plane of the casing 1 bottom is 30 to 60 degrees; the included angle between the plane where the display means 24 is located and the plane of the casing 1 bottom is 30 to 60 degrees. The display means 24 and the viewing panel 27 are arranged obliquely, such that the top of the casing is designed to be arc-shaped, which further reduces the occupation space, and is more suitable for the hand shape of human, such that the distance measuring device is more portable.

Figure 10:
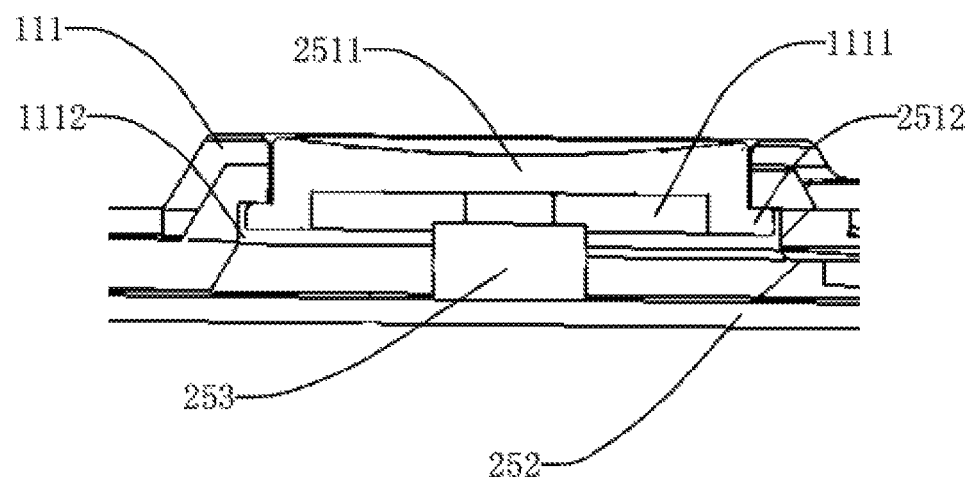
FIG. 10 is a sectional structural schematic view of the operating means in the embodiment of the present invention.

As shown in FIGS. 1, 8 and 10, in the present embodiment, the operating means includes a key 251, an operating circuit board 252 and a press switch 253.

The operating circuit board 252 is parallel with the circuit board 23 and is fixed to the first housing bottom face 111; the operating circuit board 252 is electrically connected to the processor 231, for transmitting at least one control instruction to the laser ranging device 21. The press switch 253 is arranged at one side of the operating circuit board 252 close to the first housing bottom face 111; the key 251 passes through the first housing bottom face 111, one end of the key 251 is connected to the press switch 253, and the other end thereof is arranged at the outer surface of the first housing 11.

As shown in FIG. 10, the first housing bottom face 111 includes a key mounting hole 1111 and a mounting hole groove 1112, the key mounting hole 1111 penetrating through the first housing bottom face, and the mounting hole groove 1112 is arranged at the edge of the key mounting hole 111. The key 251 includes a key body 2511 and a key snap block 2512, the key body 2511 is columnar, penetrating through the key mounting hole 1111, and the key snap block 2512 protrudes from the edge of the key body 2511, snapped into the mounting hole groove 1112. When the key body 2511 is pressed, the key snap block 2512 slides in the mounting hole groove 1112, the press switch 252 is also pressed, and the circuit board acquires one electric signal.

The key 251 is used for inputting at least one control action each corresponding to one control instruction. When the key 251 is pressed to input one control instruction, the press switch 253 is also pressed, and the operating circuit board 252 converts the control action into at least one electric signal, and according to the number of times the key is pressed, transfers one electric signal containing the control instruction to the processor 231; and each electric signal corresponds to one control instruction. In the present embodiment, the key 251 corresponds to two control instructions, that is, a turn-on instruction and a turn-off instruction, for turning on and turning off the distance measuring device.

In order to be convenient for the user to operate and use, in the present embodiment, the technical solution that the viewing panel 27 and the display means 24 arranged on the upper surface of the housing 1 are preferably adopted, and the user can see the display means 24 once lowering his or her head, which is convenient to operate the distance measuring device and read the readings of the distance to be measured. The key 251 is arranged in the middle of the outer surface of the first housing bottom face 111, which is convenient for the user to press it using his or her thumb. The display means 24 and the operating means 25 can be designed in an integrated manner, that is, to adopt the touch screen, realizing the operation control function and the reading display function at the same time. Due to the high cost of the touch screen, the application of this solution is limited to some extent.

The power supply 26 can be a button battery, a rectangular parallelepiped battery or two cylindrical batteries arranged side by side. The button battery has small volume, takes up small space, and can effectively reduce the volume of the distance measuring device. However, the button battery has a small electric quantity, so the user needs to change the battery frequently, and the use cost is high. The rectangular parallelepiped battery and the cylindrical battery have a greater electric quantity than the button battery, so they are changed infrequently, which can reduce the use cost, but they are inconvenient to carry or use due to the large volumes. Both the rectangular parallelepiped battery and the cylindrical battery can be rechargeable batteries, thereby further reducing the use cost. In the present embodiment, the power supply 26 is preferably a cylindrical battery.

Figure 11:
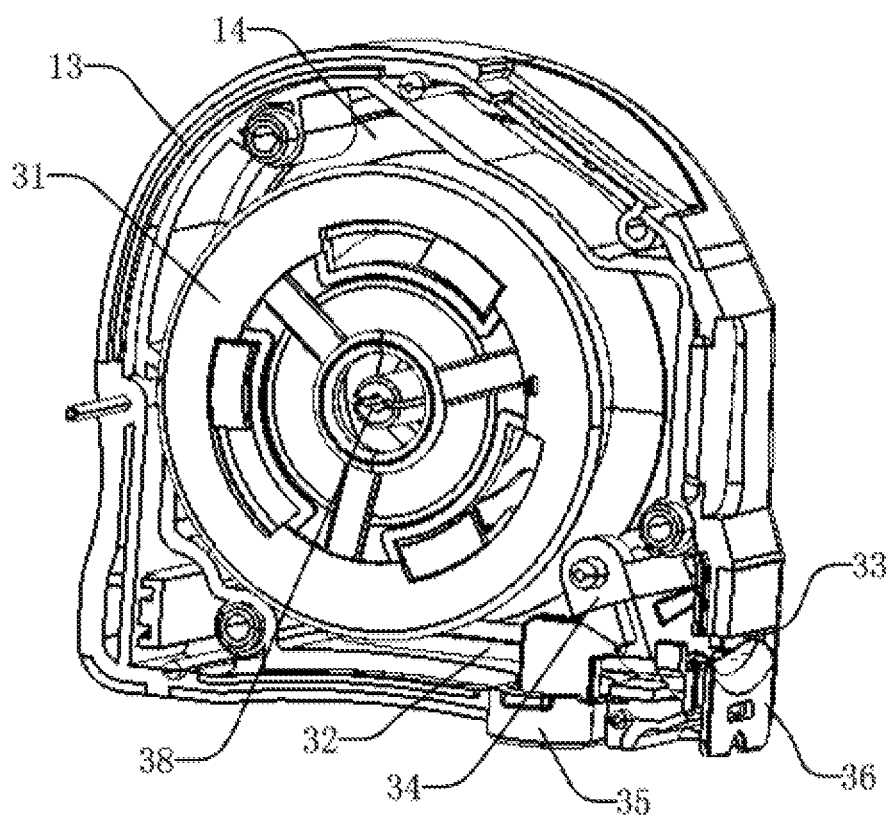
FIG. 11 is a structural schematic view of the inside of the first housing in the embodiment of the present invention.
Figure 12:
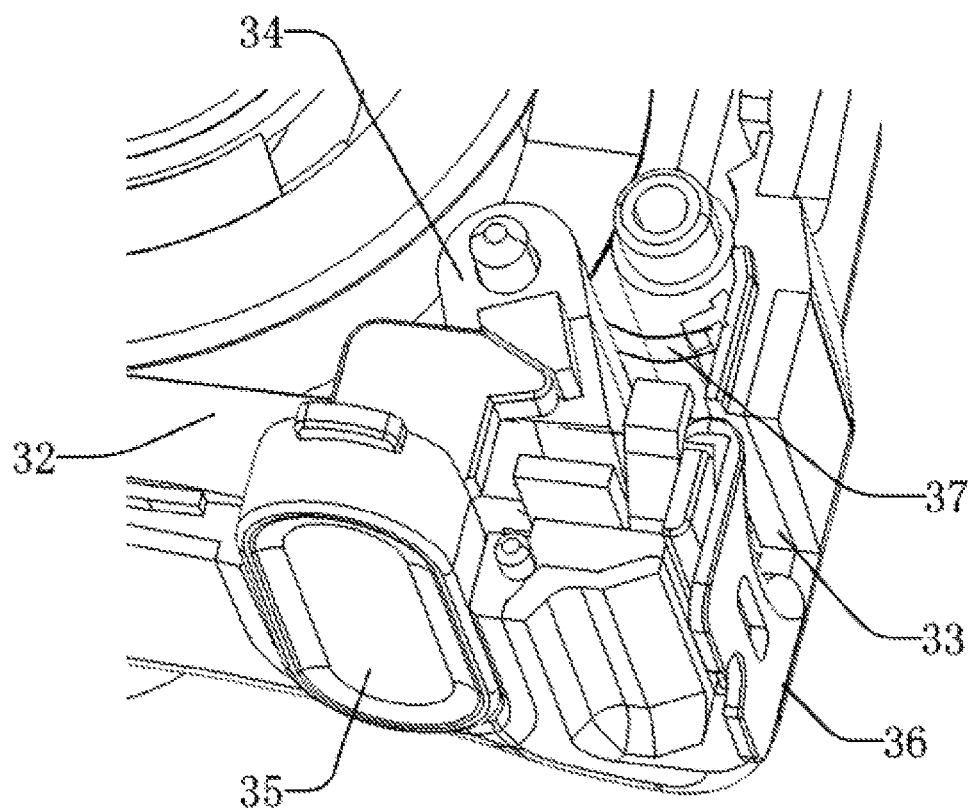
FIG. 12 is a partially enlarged view of the locking mechanism in the embodiment of the present invention.
Figure 13:
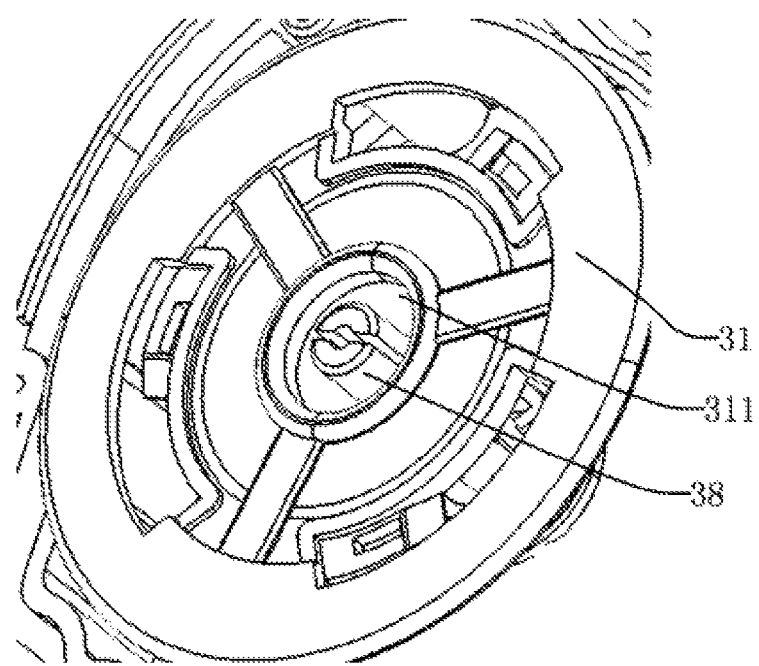
FIG. 13 is a partially enlarged view of the tapeline wheel in the embodiment of the present invention.

As shown in FIGS. 11-13, the tapeline structure 3 includes a tapeline wheel 31, a tape 32, a tape outlet 33, a press block 34, a lock key 35 and an elastic member 37, in which the press block 34, the lock key 35 and the elastic member 37 form a locking mechanism together, for locking the length of the tape extending out of the casing 1, so as to read the readings.

The tapeline wheel 31 is rotatably mounted into the tapeline cavity 14; the tape 32 is fully or partially wound onto the tapeline wheel 31; one end of the tape 32 is fixedly connected to the tapeline wheel 31, and the other end thereof is provided with the tapeline end portion 36. The tape outlet 33 is arranged at the lower end of the side wall of the casing 1, and the tapeline end portion 36 extends out of the casing 1 through the tape outlet 33; and the press block 34 is arranged inside the housing 1 close to the tape outlet 33. When the tape 32 is pulled out of the housing 1, the press block 34 is used for pressing against the tape 32, such that the length of the tape 32 outside the casing 1 keeps constant; one end of the elastic member 37 is connected to the press block 34, the other end thereof is connected to the second housing 12, for assisting the press block 34 to restore to the original position; the lock key 35 is connected to the second housing or the third housing through the elastic member (preferably, a small spring), for controlling the press block 34 to press against or release the tape 33.

One end of the lock key 35 is arranged at the outer surface of the second housing 12, and the other end thereof is tangent to or separated from the press block 34, for controlling the press block 34 to press against or release the tape 32. When the lock key 35 is pressed, the lock key 35 is tangent to the press block 34 which releases the tape 32; when the lock key 35 is released, the lock key 35 is separated from the press block 34 which presses against the tape 32. The user can control the extending length of the tape by pressing or releasing the lock key 35, so as to lock the tape extending length and be convenient for reading.

The tapeline wheel 31 is rotatably mounted into the tapeline cavity 14. Specifically, the middle the second housing bottom face 121 is provided with a protruding shaft lever 38, perpendicular to the second housing bottom face 121; the center of the tapeline wheel 31 is provided with a sleeve hole 311, circumferentially surrounding to the outside of the shaft lever 38; and when the tape 32 is pulled out, the tapeline wheel 31 rotates.

Also, the tapeline structure 3 may be any tapeline in the prior art. The tapeline structure 3, in operation, uses the tapeline end portion 36 to pull the tape 32 out of the housing 1, for implementing the measurement. After the measurement, the lock key 35 needs to be pressed, and the press block 34 therein presses against the tape 32, such that the length of the tape 32 out of the casing 1 keeps constant, and thereby the length reading on the tape 32 is read. In the present embodiment, the lock key 35 is one key arranged at the bottom face 16 of the housing 1. After pressed for the first time, the press block 34 presses against the tape 32; after the length value is read, and the press block is pressed again, the press block 34 releases the tape 32, and after the length reading is read, the tape 32 is retracted into the housing 1.

The tapeline structure 3 has the following preferable solution. The width of the tape 32 is less than or equal to 2 cm, preferably 1 cm; the tape 32 has a length of less than or equal to 2 m, which effectively reduces the volume of the tape 32 wound on the tapeline wheel 31, reduces the space of the tape 32 taking up in the distance measuring device, and reduces the width of the distance measuring device. For the combination of the laser generating means 21 and the photoelectric conversion means 22, if the object to be measured is longer than 2 meters, its measurement accuracy is relatively high, so the present embodiment is applicable for various scenarios as long as the tape length of the tapeline reaches 2 metres.

As shown in FIG. 2, the front side surface 11 of the housing 1 is further provided with a clip 5 used by the user to clip the distance measuring device on the waistband, which is convenient to carry.

The present invention has the technical effects that a distance measuring device is provided, in which the laser ranging device and the tapeline structure are arranged in the same casing, such that the distance measuring device has the functions of short-distance measurement and long-distance measurement at the same time, is convenient and flexible, and has high measurement accuracy. The height and width of the distance measuring device of the present embodiment are similar to those of the ordinary tapeline, which takes up small space, is convenient for human hand to hold and convenient for the user to operate and use during operation.

The above are only the preferable embodiments of the present invention. Without departing from the principles of the present invention, persons skilled in the art can further make improvements and polishments to the above technical solutions. Such improvements and polishments shall be within the protection scope of the present invention.

The invention claimed is:
1. A distance measuring device, comprising
    a casing comprised of a first housing and a second housing;

a third housing, arranged between the first housing and the second housing, and rounding together with the second housing to form a tapeline cavity;

a tapeline structure, arranged inside the tapeline cavity; and a laser ranging device, arranged between the first housing and the third housing.

2. The distance measuring device according to claim 1, wherein the first housing comprises a first housing bottom face and a first housing side wall;

the second housing comprises a second housing bottom face and a second housing side wall;

the third housing comprises a third housing bottom face and a third housing side wall;

the second housing side wall and the first housing side wall are connected to each other, forming a side wall of the casing; and the third housing side wall is connected to the second housing bottom face.

3. The distance measuring device according to claim 2, further comprising a sheath partially or fully covering the first housing side wall and the second housing side wall, and/or partially or fully covering a joint between the first housing bottom face and the first housing side wall.

4. The distance measuring device according to claim 1, wherein the laser ranging device comprises a laser generating means, for emitting measurement light beams to an object to be measured; the object to be measured reflecting the measurement light beams and generating reflective light rays;

a photoelectric conversion means, for capturing all or part of the reflective light rays, and converting an optical signal of the captured reflective light rays into at least one feedback electric signal;

a circuit board provided with a processor; and a power supply connected to the laser generating means, the photoelectric conversion means and the circuit board;

wherein the processor is connected to the laser generating means, for controlling the laser generating means;

the processor is connected to the photoelectric conversion means, for acquiring the feedback electric signal and calculating the distance from the object to be measured to the distance measuring device.

5. The distance measuring device according to claim 4, wherein the laser generating means comprises a light-emitting surface recessed on the first housing side wall;

the photoelectric conversion means comprises a light-receiving surface recessed on the first housing side wall and being adjacent to the light-emitting surface.

6. The distance measuring device according to claim 4, wherein the circuit board is parallel with the first housing bottom face;

the laser generating means, the photoelectric conversion means and the circuit board are all located above or beneath the power supply;

the laser generating means and the photoelectric conversion means are located at the left side or right side of the circuit board.

7. The distance measuring device according to claim 4, wherein the circuit board is located at the left side or right side of the power supply;

the circuit board is parallel with the first housing bottom face.

8. The distance measuring device according to claim 4, further comprising a viewing panel, which is made of a transparent material and arranged on the surface of the first housing and/or the second housing;

a display means mounting bracket, which inwardly protrudes from the first housing bottom face and the first housing side wall and is arranged opposite to the viewing panel; and a display means, which is parallel with the viewing panel and is mounted to the display means mounting bracket; the display means is connected to the processor, for displaying the distance from the object to be measured to the distance measuring device.

9. The distance measuring device according to claim 8, wherein an included angle between the plane where the viewing panel is located and the plane of the casing bottom is 30 to 60 degrees;

an included angle between the plane where the display means is located and the plane of the casing bottom is 30 to 60 degrees.

10. The distance measuring device according to claim 4, further comprising an operating circuit board, which is parallel with the circuit board, fixed to the first housing bottom face, and electrically connected to the processor;

a press switch, provided at one side of the operating circuit board close to the first housing bottom face; and a key, which passes through the first housing bottom face, one end of the key being connected to the press switch and the other end thereof being arranged at the outer surface of the first housing.

11. The distance measuring device according to claim 10, wherein the first housing bottom face comprises a key mounting hole penetrating through the first housing bottom face; and a mounting hole groove provided at an edge of the key mounting hole;

the key comprises a key body which is columnar and penetrates through the key mounting hole and a key snap block protruding from the key body edge, and snapped into the mounting hole groove.

12. The distance measuring device according to claim 4, wherein the circuit board is provided with a memory which is connected to the processor, for storing the distance from the object to be measured to the distance measuring device.

13. The distance measuring device according to claim 1, wherein the laser generating means comprises, but not limited to, a laser tube;

the photoelectric conversion means comprises, but not limited to, a photoelectric sensor;

the power supply comprises, but not limited to, a button battery, a rectangular parallelepiped battery or a cylindrical battery.

14. The distance measuring device according to claim 1, wherein the tapeline structure comprises a tapeline wheel, rotatably mounted into the tapeline cavity;

a tape, fully or partially wound onto the tapeline wheel; one end of the tape is fixedly connected to the tapeline wheel, and the other end thereof is provided with a tapeline end portion; and a tape outlet, provided at the lower end of the side wall of the casing, the tapeline end portion extending out of the casing through the tape outlet.

15. The distance measuring device according to claim 14, wherein the middle of the second housing bottom face is provided with a protruding shaft lever, which is perpendicular to the second housing bottom face;

the center of the tapeline wheel is provided with a sleeve hole circumferentially surrounding the outside of the shaft lever;

the tapeline wheel rotates when the tape is pulled out.

16. The distance measuring device according to claim 14, wherein the tapeline structure further comprises a press block, provided inside the tapeline cavity and close to the tape outlet;

an elastic member, one end of which is connected to the press block, and the other end thereof is connected to the second housing; and a lock key, connected to the second housing or the third housing through the elastic member; one end of the lock key is provided at the outer surface of the second housing, and the other end thereof is tangent to or separated from the press block;

when the lock key is pressed, the lock key is tangent to the press block and the press block releases the tape;

when the lock key is released, the lock key is separated from the press block and the press block presses against the tape.

* * * * *